(12) United States Patent
Malle

(10) Patent No.: US 7,475,616 B2
(45) Date of Patent: Jan. 13, 2009

(54) PEDAL SYSTEM

(75) Inventor: Manfred Malle, Feistritz i. Ros. (AT)

(73) Assignee: Malle OEG - Technisches Buero Fuer Maschinen - Und Anlagenbau, Feistritz I. Ros. (AT)

(*) Notice: Subject to any disclaimer, the term of this patent is extended or adjusted under 35 U.S.C. 154(b) by 79 days.

(21) Appl. No.: 10/509,900

(22) PCT Filed: Apr. 1, 2003

(86) PCT No.: PCT/EP03/03367

§ 371 (c)(1),
(2), (4) Date: Aug. 17, 2005

(87) PCT Pub. No.: WO03/084808

PCT Pub. Date: Oct. 16, 2003

(65) Prior Publication Data

US 2006/0090590 A1    May 4, 2006

(30) Foreign Application Priority Data

Apr. 5, 2002  (AT) ............................... A 533/2002

(51) Int. Cl.
G05G 1/14  (2006.01)
(52) U.S. Cl. ..................................... 74/594.6; 74/594.4
(58) Field of Classification Search ................. 74/594.4, 74/594.6; B62M 3/08
See application file for complete search history.

(56) References Cited

U.S. PATENT DOCUMENTS 4,488,453 A * 12/1984 Drugeon et al. ............ 74/594.6
4,686,867 A * 8/1987 Bernard et al. ............. 74/594.6
4,932,287 A * 6/1990 Ramos ...................... 74/594.6
5,060,537 A * 10/1991 Nagano ..................... 74/594.6
5,423,233 A * 6/1995 Peyre et al. ................ 74/594.6

(Continued)

FOREIGN PATENT DOCUMENTS

DE         34 26 103          7/1984

(Continued)

OTHER PUBLICATIONS

Wedge (mechanical device); www.en.wikipedia.org/wiki/Wedge_%28mechanical_device%29; Sep. 14, 2007.*

(Continued)

*Primary Examiner*—Vinh T. Luong
(74) *Attorney, Agent, or Firm*—Flynn, Thiel, Boutell & Tanis, P.C.

(57) ABSTRACT

A pedal system for bicycles includes a shoe insert, which can be fastened to the exterior of a shoe, having a detent element. The pedal system also includes a pedal, which can be fastened to the bicycle, can rotate about an axis, and which has a seat for accommodating the detent element. The detent element can be locked counter to elastic force inside the seat and can be released therefrom by executing a rotating movement. The seat for the detent element is formed between two seat parts, which are rotationally symmetrical with regard to the pedal axis and which can be displaced away from one another counter to elastic force in the direction of the pedal axis.

14 Claims, 5 Drawing Sheets

U.S. PATENT DOCUMENTS

Figure 1:
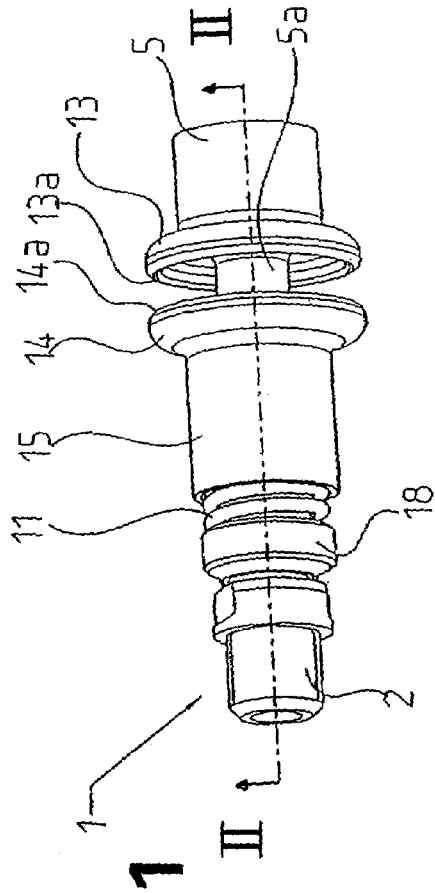

| | | | | |
|---|---|---|---|---|
| 5,699,699 A | * | 12/1997 | Nagano | 74/594.6 |
| 6,085,614 A | * | 7/2000 | Lin | 74/594.6 |
| 2005/0011305 A1 | * | 1/2005 | Menayan | 74/594.6 |
| 2007/0137431 A1 | * | 6/2007 | Couturet et al. | 74/594.6 |

FOREIGN PATENT DOCUMENTS

| | | | |
|---|---|---|---|
| DE | G 84 04 243.5 | | 11/1984 |
| DE | 34 31 935 | | 3/1986 |
| EP | 0826589 A1 | | 3/1998 |
| EP | 1167173 A2 | | 1/2002 |
| FR | 2 624 470 | * | 6/1989 |

OTHER PUBLICATIONS

Wedge;The Free Dictionary; www.thefreedictionary.com/wedge; 2007.*

Wedge—from Wolfram Math World; mathworld.wolfram.com/Wedge.html; 1999-2007.*

PTO 08-0043 STIC Translation of FR 2 624 470, Lyotard, Dec. 11, 1987.*

* cited by examiner

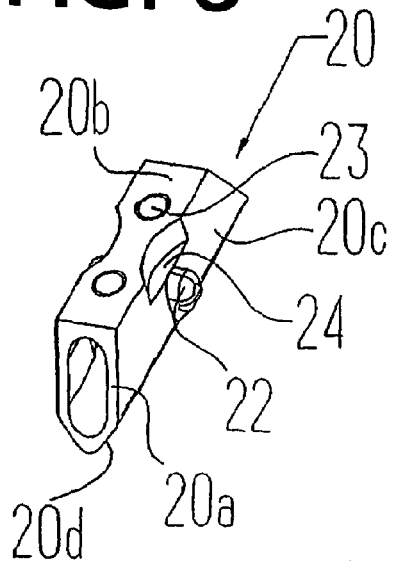
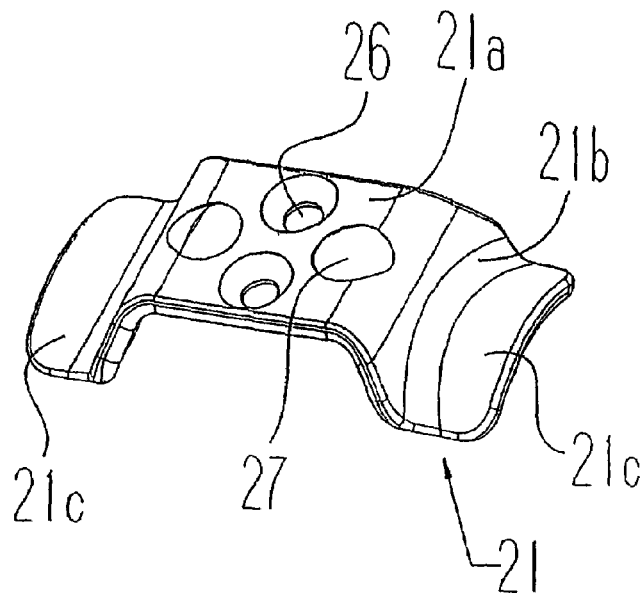
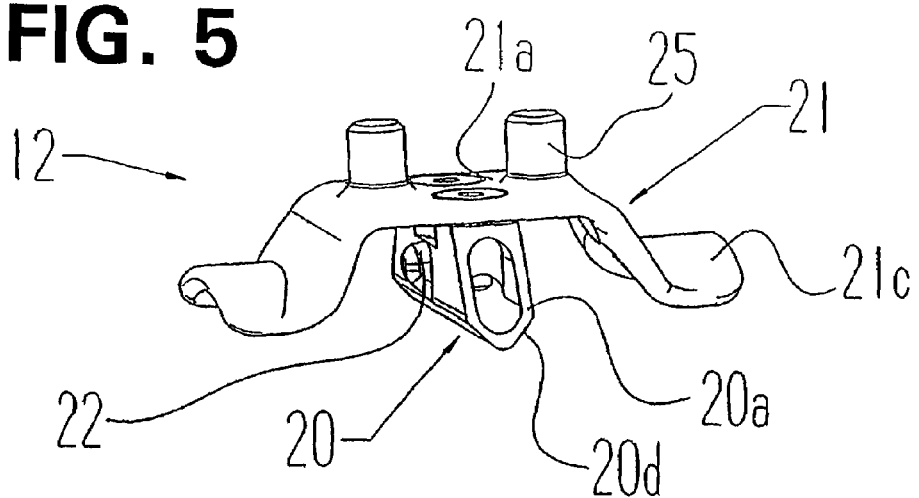
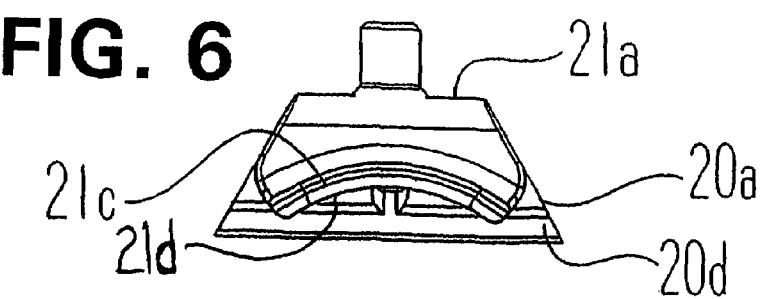

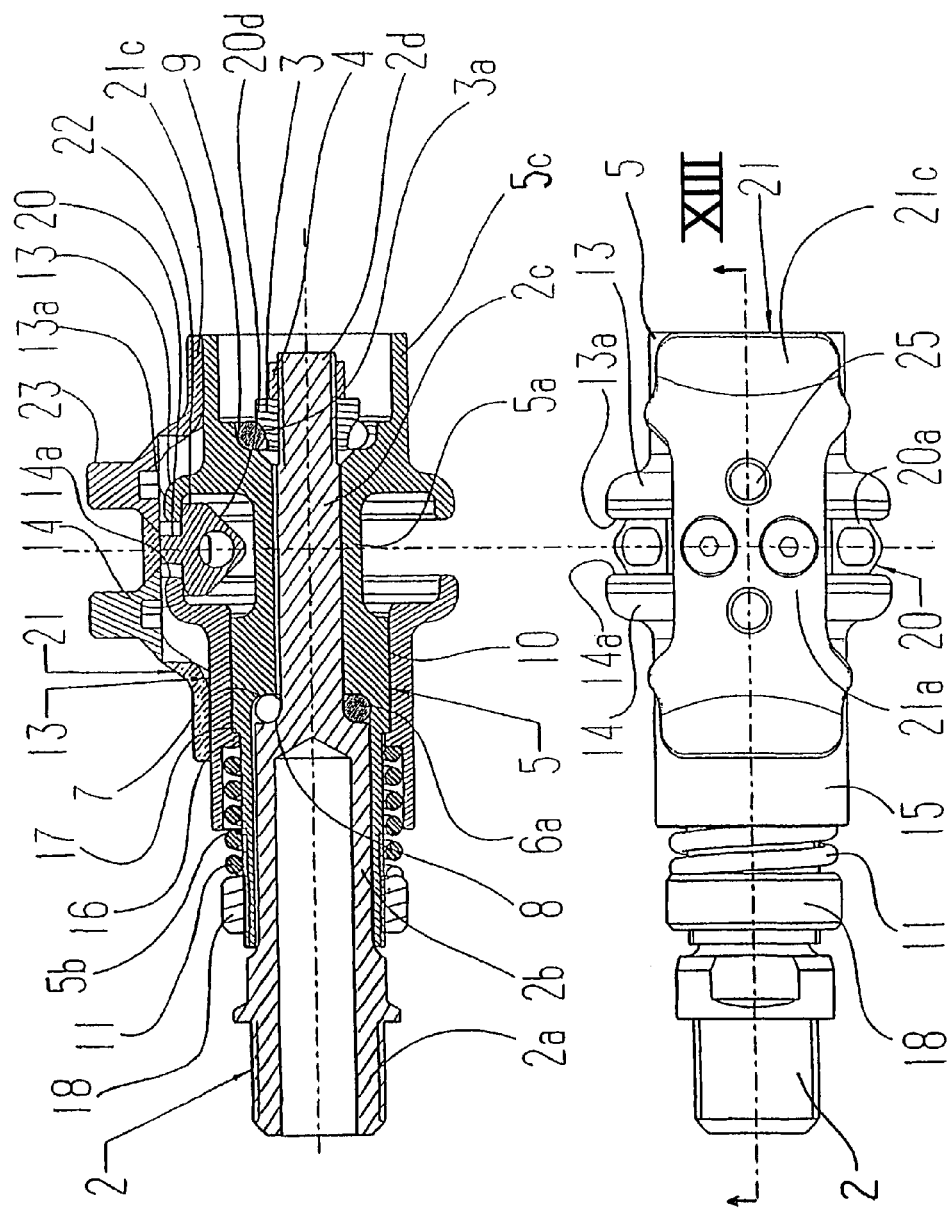

PEDAL SYSTEM

FIELD OF THE INVENTION

The invention relates to a pedal system for bicycles comprising a shoe insert, which can be fastened on a shoe and has a detent element, and a pedal, which can be fastened on the bicycle and can be rotated about an axis, and which pedal has a seat for the detent element, in which seat said detent element can be locked against elastic force, and from which seat same can be released by carrying out a rotating movement.

BACKGROUND OF THE INVENTION

Pedal systems have been successful for racing bikes and mountain bikes, which pedal systems consist of shoe inserts fastened on the shoes and of pedals fastened on the bicycle. Pedals which each have locking mechanisms and which are designed correspondingly on two opposing sides, for the releasable locking of the detent element of the shoe insert, are common. Such pedal systems are known, for example, from EP-A-1 167 173 and the EP-A-O 826 589. Since these pedal systems have two locking mechanisms and thus make available two locking positions for the shoe insert, they are designed very complex and consist of many, often small components. This makes this pedal system susceptible to repairs and sets limits to the desire to have them have as low a weight as possible. Also with respect to their function these pedal systems are not optimal. The user must beforehand adjust the position of the pedal relative to the shoe insert in order to be able to carry out a locking. The shoe must under all possible circumstances, in particular in the case of a fall of the biker, be able to be quickly and easily released, even when the biker cannot release the pedal by force. Many of the known pedal systems are also in need of improvement in this regard.

Thus the basic purpose of the invention is to design a pedal system of the above-mentioned type in particular in such a manner that, for locking of the detent element of the shoe insert, a beforehand positioning of the pedal is not needed, and that is designed simply and has fewer components than the known systems.

The set purpose is attained inventively by the seat being formed between two seat parts, which are designed rotationally symmetrically with respect to the pedal axis, and which can be moved away from one another against elastic force in the direction of the pedal axis.

An inventively designed pedal system has therefore a pedal with a seat for the detent element, which permits equally over the entire circumference a locking of the detent element. Thus the necessity of having to pay attention regarding the insertion of the shoe at a specific pedal position is no longer needed. Compared with the double locking mechanisms common from the known pedal systems, an inventive pedal system can thus also have significantly fewer components. This is advantageous for the weight and the durability of the pedal.

A preferred embodiment of the invention is that the seat parts form or have receiving grooves facing one another. Thus a particularly operationally safe design can be assured.

It is thereby merely necessary that one of the two seat parts can be moved against elastic force, thus supporting a simple design and reducing the number of components.

A simple, advantageous and very robust design of the pedal provides that one of the seat parts is part of a first sleeve which is supported rotatably with respect to the axis of the pedal, and the other seat part is part of a second sleeve which is supported movably on the first sleeve.

The pedal can be designed especially compact by the first sleeve being arranged non-movably with respect to the axis of the pedal, and the second sleeve being the one which is arranged movably against elastic force.

Also the design and storing of the at least one spring has influence on the durability of operational safety of the pedal system. It is particularly favorable in this connection when at least one spring is a compression spring, which is supported with its one end on an abutment connected to the first sleeve and with its second end on the second sleeve.

The first sleeve is rotatably supported in an advantageous manner by means of ball bearings directly on the axis part of the pedal.

The detent element provided on the base of the shoe is designed according to a preferred embodiment, of the invention as an elongated component, which has a wedge-shaped designed area for positioning between the seat parts.

Cams are sufficient for locking of the detent element, which cams are provided on the side surfaces of the detent element.

Of a particularly comfortable design is the handling of an inventively designed pedal system furthermore by connecting the detent element to a control element, which acts centeringly with respect to the seat of the pedal.

The control element is designed in an advantageous manner such that it has laterally extending supporting wings, the inside of which come into contact or are in contact with outer surface areas of the sleeves when the detent element is locked, which outer surface areas extend cylindrically and rotationally symmetrically with respect to the pedal axis, and which are curved with a radius, which is larger than the radius of the outer surfaces of the sleeves. The difference between the radii assures the already mentioned centering function and has moreover the advantage, that during a rotational movement in order to release the locked detent element, the supporting wings are supported in such a manner on the outer surfaces of the sleeves that they lift the detent element and free same automatically from the locked position.

BRIEF DESCRIPTION OF THE INVENTION

The desire for few components and low weight is helped when the control element is part of the shoe insert, which part is connected directly to the shoe.

Figure 2:
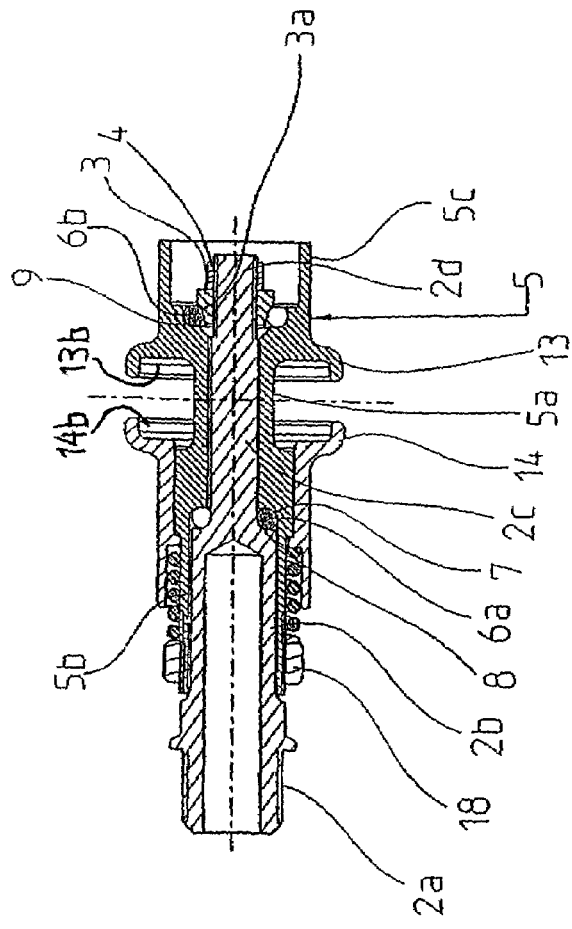
Figure 7:
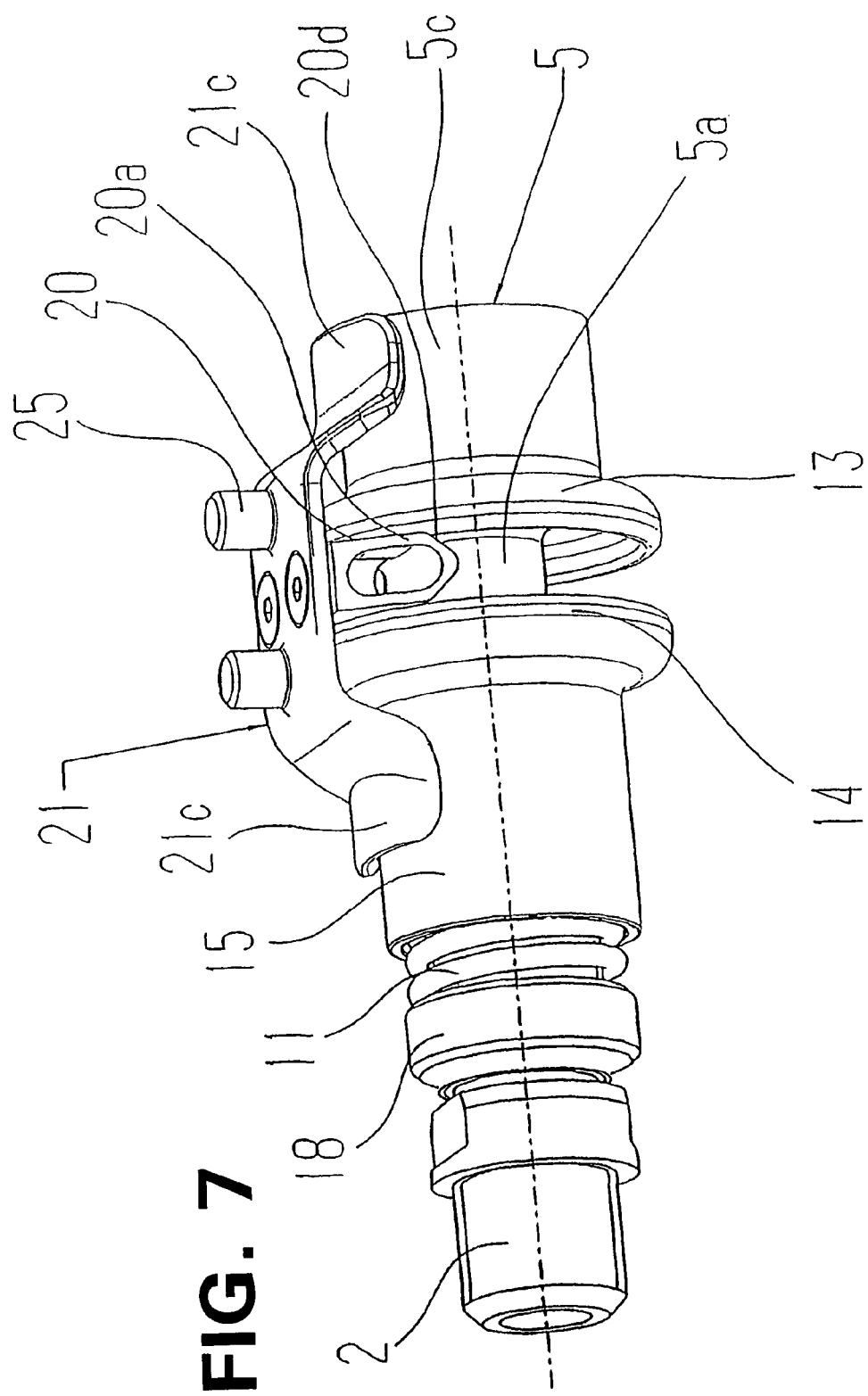
Figure 10:
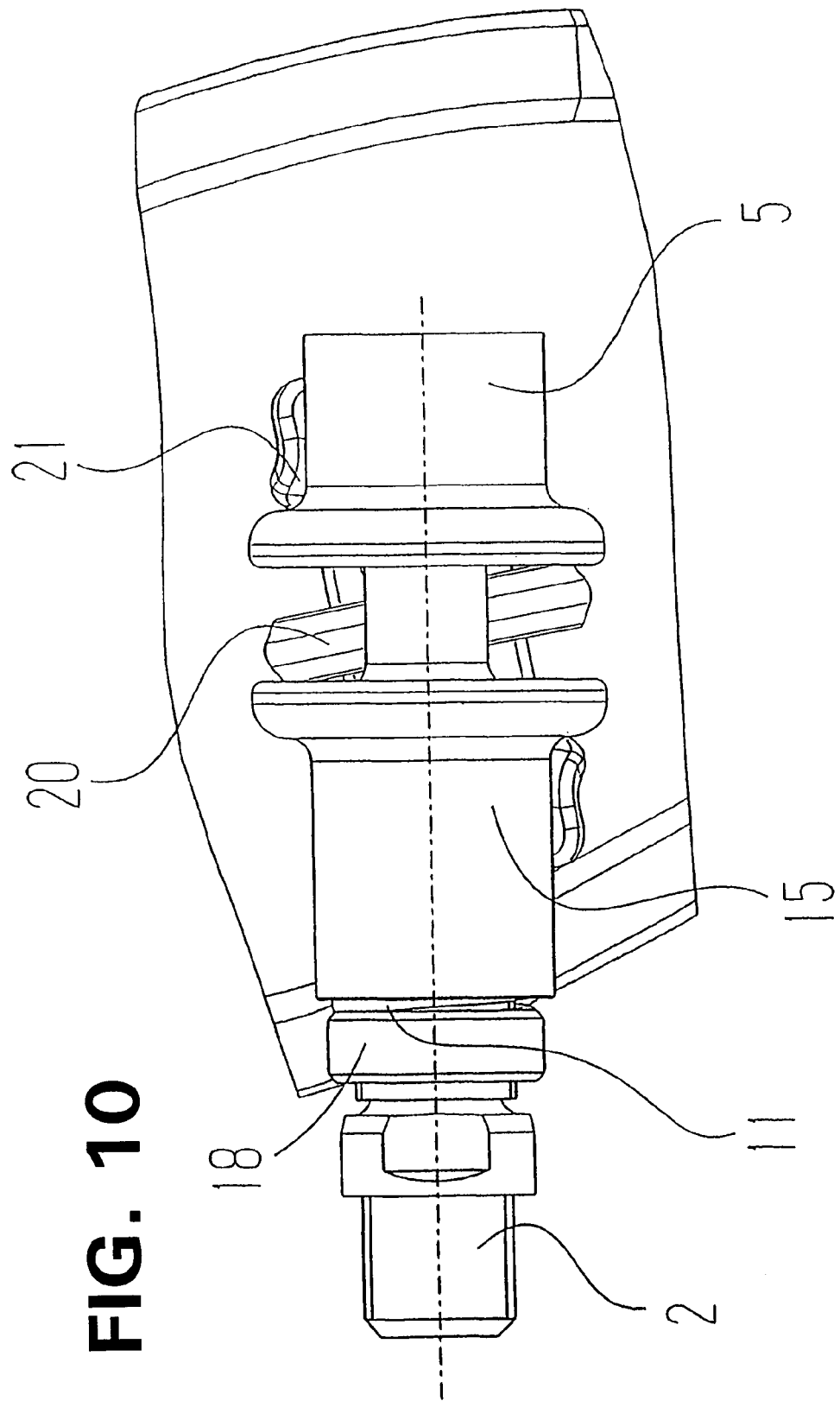

Further characteristics, advantages and traits of the invention will now be described in greater detail in connection with the drawings which illustrate one exemplary embodiment and in which:

FIG. 1 is an oblique view of the pedal,

FIG. 2 is a longitudinal cross-sectional view of the pedal according to FIG. 1, FIGS. 3 and 4 are oblique views of parts of the shoe insert, FIG. 5 is an oblique view of the shoe insert, FIG. 6 is a side view of the shoe insert, FIG. 7 is an oblique view of the pedal with a locked shoe insert, FIG. 8 is a longitudinal cross-sectional view of the pedal with a locked shoe insert, FIG. 9 is a top view of the pedal with an inserted shoe insert, and FIG. 10 illustrates a position of the shoe insert relative to the pedal during the release of the lock of the shoe insert.

DETAILED DESCRIPTION OF THE INVENTION

The parts of the pedal system, which are provided for arrangement or fastening on the bicycle, are hereinafter identified as pedal 1, and those parts, which are provided for fastening on a sole of the shoe, as shoe insert 12.

The design and the individual parts of the pedal 1 will now be discussed in greater detail in particular with reference to FIGS. 1 and 2. The pedal 1 has an axis part 2 which is fixedly screwed to the crank of a bicycle (not illustrated). The axis part 2 consists of several cylindrical sections, which are arranged concentrically to one another and have varying diameters. The axis part 2 has at its one end in a conventional manner an inner end section 2*a* with a thread for screwing of the pedal 1 to the crank of the bicycle. The end section 2*a* is followed by a first bearing section 2*b*, which is followed by a second bearing section 2*c* with a smaller diameter. The last section is an outer end section 2*d*, which has a smaller diameter than the second bearing section 2*c*. The outer section 2*d* has a thread for screwing on a bearing nut 3 and a lock nut 4.

A sleeve 5 is rotatably supported on the bearing sections 2*b* and 2*c*, which sleeve is not movable in axial direction relative to the axis part 2. The sleeve 5 has a center section 5*a*, with which it is supported on the second bearing section 2*c*, and each one inner and one outer end section 5*b*, 5*c*. A circular shoulder 7 in the transition area of the center section 5*a* to the inner end section 5*b* forms together with a circular shoulder 8 in the transition area of the first bearing section 2*b* to the second bearing section 2*c* a seat area for a first ball bearing 6*a*. A further circular shoulder 9 in the transition area between the center section 5*a* and the outer end section 5*c* of the sleeve 5 forms together with a seat area 3*a* circulating at the bearing nut 3 a seat for a second ball bearing 6*b*. The outer end section 5*c* of the sleeve 5 is designed like a hollow cylinder and has such large diameters so that the second ball bearing 6*b*, the bearing nut 3 and the lock nut 4 can be positioned.

The center section 5*a* of the sleeve 5 has on the outside a concentrically circular seat part 13 having an also circular receiving groove 13*b*, which seat part 13 is open in direction of the inner end section 5*b*. The seat part 13 forms together with a correspondingly designed second seat part 14 of a further sleeve 15, having a groove 14*b*, the locking point for the shoe insert 12 to be described in greater detail later on. The faces of the edge areas 13*a*, 14*a* of the seat parts 13, 14 face one another in alignment. The sleeve 15 is moved onto a cylindrical seat 10 on the outside of the center section 5*a* of the sleeve 5. The cylindrical seat 10 has compared with the inner end section 5*b* of the sleeve 5 slightly larger diameter and is offset relative to same by a circular step 17. The step 17 forms a stop for a shoulder 16 around the inside of the sleeve 15. The one end of a compression spring 11 is supported on the shoulder 16, the second end of which compression spring 11 is loaded by an adjusting nut 18, which is screwed onto the inner end section 5*b* of the sleeve 5. Thus it is possible to change the initial loading of the compression spring 11 by adjusting the position of the adjusting nut 18. The end section following the supporting shoulder 16 of the sleeve 15 forms together with an area of the outer circumferential surface of the inner end section 5*b* of the sleeve a seat for the compression spring 11.

FIGS. 3 to 6 illustrate particularly well the design and arrangement of the parts of the shoe insert 12. The main parts of the shoe insert 12 are a detent element 20 (FIG. 3) and a control element 21 (FIG. 4). The detent element 20 is an elongated component, which in the illustrated embodiment has a cavity over its longitudinal extent in order to reduce its weight. The detent element 20 has side surfaces 20*c*, which extend parallel to one another, are of the same size and are designed in the form of equal-sided trapezoids, a rectangular upper side 20*b* and faces 20*a* with wedge-shaped converging side edges so that the underside opposite the upper side 20*b* is formed by two wedge surfaces 20*d*. A cam 22 is provided centrally on each side surface 20*c*. Two screw holes 23 for connecting of the detent element 20 to the control element 21 and two recesses 24 can be recognized on the upper side 20*b* of the detent element 20, which recesses 24 make available space for screw heads of screws 23 (see FIG. 8) for fastening of the control element 21 to the shoe (not illustrated).

The control element 21 consists of a center base part 21*a*, which has the screw holes 26 for connecting to the detent element 20 and the screw holes 27 for connecting of the element 21 to the shoe. Supporting wings 21*c* follow the base part 21 through slightly inclined connecting surfaces 21*b*, the underside of which supporting wings 21 is curved along arches, the radii 21*d* of which are slightly larger than the radius of the outer surface of the outer end section 5*c* of the sleeve 5 or the radius of the outer surface of the sleeve 21, the radii of which correspond in the illustrated embodiment. The control element 21 and the detent element 20 are furthermore in the illustrated embodiment components symmetrically designed with respect to their longitudinal and transverse axes. The detent element 20 screwed to the underside of the base part 21*a* projects beyond the lateral supporting wings 21*c* of the control element 21.

FIGS. 7 to 10 illustrate the shoe insert 12 in its position inserted on the pedal 1, the cams 22 grip under the edge areas 13*a*, 14*a* of the seat parts 13, 14 and the supporting wings 21*c* contact centrally the outsides of the sleeves 5 or 15.

The inventive pedal system does not only have a simple design but is also especially functional. In order to lock the shoe insert 12 on the pedal 1, the pedal 1 does not need to assume a particular position; a locking of the detent element 20 in the seat formed between the seat parts 13, 14 is equally possible over the entire circumference of the pedal 1. The biker must merely position the detent element 20 between the two parts 13, 14 and lock same by applying a certain force. The wedge surfaces 20*d* of the detent element 20 make positioning of the same easier. The sleeve 15 is during the locking operation moved against the force of the spring 11 by the cams 22. When the two cams 22 are within the edge areas 13*a*, 14*a*, the sleeve 15 is returned again into its initial position. The shoe insert 12 is therefore frictionally connected to the pedal 1 so that the pedal system can be stressed both for pull and also pressure. Due to their particular design, the two supporting wings 21*c* perform, during the insertion of the detent element 20, a control function to center the detent element 20, which, if necessary, is initially positioned off-center (in relationship to the longitudinal axis of the pedal 1).

The release of the shoe insert 12 from the pedal 1 is possible quickly and without any problems under all possible conditions—also in the case of a fall of the biker. Even when a force is applied from the shoe onto the pedal 1, a quick release of the shoe from the pedal 1 is guaranteed by a turning of the shoe into one of the two directions. A turning of the shoe and thus of the shoe insert 12 has the consequence that, as illustrated in FIG. 10, the detent element 20 moves the sleeve 15 against the force of the spring 11 and enlarges the opening between the seat parts 13, 14 so wide that the detent element 20 can come free. The supporting wings 21*c*, which slide on the outer surfaces of the sleeves 5 and 15, and cause at the same time due to the mentioned varying radii a lifting of the shoe insert 12 relative to the pedal 1. The components, which participate in these sequences of movement, are therefore designed and adjusted to one another in particular in such a manner that after a comparatively small angle of rotation of, for example, approximately 10°, the cams 22 are already on the faces of the edge areas 13a, 14a of the parts 13, 14. The detent element 20 is in this manner automatically freed from the locking.

The invention is not limited to the illustrated exemplary embodiment. Thus, it is, for example, possible to design the pedal 1 in such a manner that selectively one of the sleeves is arranged movably against the spring force or also that both sleeves are movable. Instead of one spring it is furthermore also possible to provide several springs.

The invention claimed is:

1. A pedal system with a shoe insert and a pedal that is rotatably mounted on a pedal axle, the pedal having a seat for a detent element of the shoe insert, in which the detent element is engaged against a spring force and from which the detent element is detached by performing a rotating movement, wherein the seat is conformed between two seat parts that are constructed rotationally symmetrically about the pedal axle, which are slidably related to each other along the pedal axle under said spring force, and which are components of sleeves with cylindrical external surfaces outside of the seat, wherein the detent element is an elongated part that extends perpendicularly to the pedal axle when engaged in the seat, and which has two cams that clasp below the seat parts in the engaged position, the shoe insert having a control element which is forced against the cylindrical external surfaces of the sleeves in such a manner that when the shoe insert is rotated to release the detent element, the detent element is raised.

2. The pedal system according to claim 1, wherein the seat parts further comprise receiving grooves facing one another.

3. The pedal system according to claim 1, wherein one of the two seat parts is displaced against said spring force.

4. The pedal system according to claim 3, wherein said sleeves comprise a first sleeve and a second sleeve, and one of the seat parts is part of the first sleeve, which is supported rotatably with respect to the pedal axle, and the other seat part is part of the second sleeve, which is supported movably on the first sleeve.

5. The pedal system according to claim 4, wherein the first sleeve is fixed along the axis of the pedal, and the second sleeve is non-fixed, and biased by said spring force.

6. The pedal system according to claim 5, wherein at least one compression spring provides said spring force, which compression spring is supported at a first end on an abutment connected to the first sleeve and at a second end on the second sleeve.

7. The pedal system according to claim 4, wherein the first sleeve is supported rotatably by means of ball bearings on the pedal axle.

8. The pedal system according to claim 4, wherein said control element acts centeringly with respect to the seat of the pedal.

9. The pedal system according to claim 8, wherein the control element has supporting wings extending laterally of the detent element, the insides of which supporting wings contact the external surfaces of the sleeves, which outer surface areas extend cylindrically and rotationally symmetrically with respect to the pedal axis, and the supporting wings are curved with a radius which is larger than a radius of the external surfaces of the sleeves.

10. The pedal system according to claim 9, wherein the control element is connected to a shoe.

11. The pedal system according to claim 1, wherein the detent element is an elongated component which has a tapered portion for aligning the detent element between the seat parts.

12. The pedal system according to claim 1, wherein the detent element has side surfaces, which have centrally each one cam.

13. A pedal system for a bicycle, with a shoe insert that is configured to attach to a shoe and has a detent element, a pedal that is configured to attach to the bicycle and is rotatably mounted on a pedal axle, the pedal including a seat for the detent element formed between two seat parts that are constructed rotationally symmetrically about the pedal axle, and which are biased toward each other along the pedal axle by spring force, the seat parts having cylindrical external surfaces positioned outside the seat along the pedal axle, wherein the detent element is an elongated part that extends perpendicularly to the pedal axle and has two cams which force the seat parts apart and clasp below the seat parts for the detent element to engage the seat, and wherein the shoe insert includes a control element comprising two wings which bear on the cylindrical external surfaces of the sleeves when the cams of the detent element are engaged below the seat parts, in such a manner that the shoe insert is rotated about an axis perpendicular to and passing through the pedal axle to force the seat parts apart against the spring force to release the detent element, and the detent element is raised out of the seat by the bearing of the wings on the cylindrical external surfaces.

14. A pedal system for a bicycle with a shoe insert that is configured to attach to a shoe and including a detent element, and with a pedal that is configured to attach to the bicycle and is rotatably mounted on a pedal axle, the pedal having a seat for the detent element, formed between two seat parts that are constructed rotationally symmetrically about the pedal axle and biased toward each other along the pedal axle by a spring force, the seat parts being components of sleeves with cylindrical external surfaces outside the seat, wherein the detent element is an elongated part that extends perpendicularly to the pedal axle when engaged in the seat, and has two cams which clasp below the seat parts, and wherein the shoe insert includes a control element having supporting wings extending laterally of the detent element, the supporting wings having an inside cylindrical surface contacting said cylindrical external surfaces of the sleeves, the inside cylindrical surface of the supporting wings having a radius of curvature which is larger than a radius of curvature of the external surfaces of the sleeves, whereby contact between the inside cylindrical surface of the supporting wings and the cylindrical external surfaces of the sleeves centers the shoe insert on the pedal, and wherein said wings of said control element are forced against the cylindrical external surfaces of the sleeves in such a manner that when the shoe insert is rotated to release the detent element, the detent element is raised.

* * * * *